March 8, 1966     J. C. ARNOLD     3,239,753
ORIENTED PARTICLE MAGNETOMETER
Filed Nov. 3, 1959
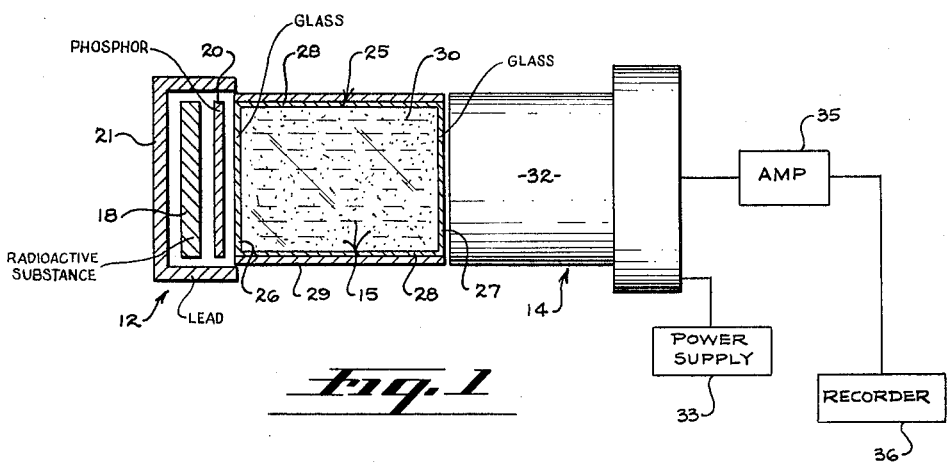
fig. 1
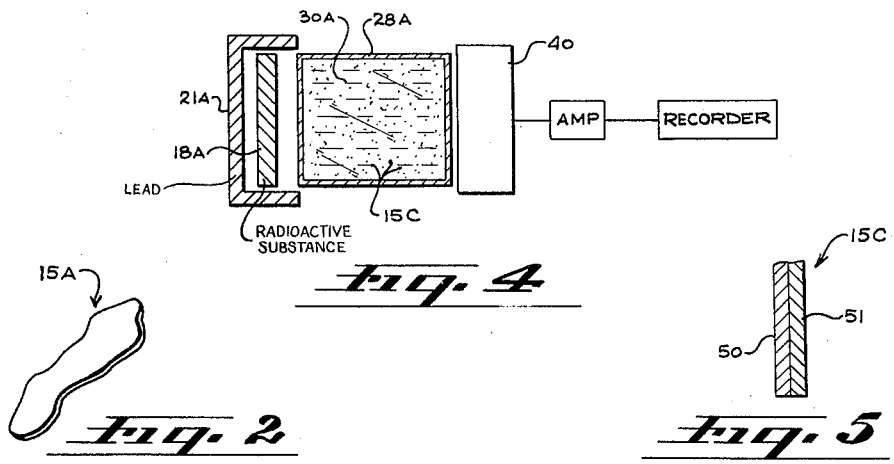
fig. 4
fig. 2
fig. 3
fig. 5
JAMES C. ARNOLD
INVENTOR
BY
*Mason & Graham*
ATTORNEYS

United States Patent Office 3,239,753
Patented Mar. 8, 1966

3,239,753
ORIENTED PARTICLE MAGNETOMETER
James C. Arnold, 5771 La Jolla Hermosa Ave.,
La Jolla, Calif.
Filed Nov. 3, 1959, Ser. No. 850,692
3 Claims. (Cl. 324—43)

This invention has to do with magnetometers.

An object of the invention is to provide a novel and improved magnetometer having unvarying accuracy over an extended predetermined period of time.

Another object is to provide a magnetometer embodying particles directionally sensitive to magnetic force disposed between a source of radiant energy and a radiant energy-sensing means to control the amount of energy reaching the sensing means and thereby enable the latter means to give an indication of the magnetic field present.

More particularly, it is an object to provide such a device in which the magnetic particles are so shaped that they offer varying degrees of interference to the passage of radiant energy dependent upon their orientation or attitude which in turn is determined by the intensity and direction of the magnetic field within which they are located.

A further object is to provide a magnetometer wherein magnetic particles are suspended in dispersed condition in a fluid substance located between a source of light and a light-sensing device. More particularly in this connection, it is an object to provide a light source having constant intensity over a long, predetermined period of time.

Still another object is to provide a novel method of sensing and indicating changes in the strength and/or direction of a magnetic field.

These and other objects will be apparent from the drawing and the following description. Referring to the drawing:

FIG. 1 is a semidiagrammatic view of apparatus embodying the invention with mechanical portions of the apparatus shown partially in section.

FIGS. 2 and 3 are perspective views, on a very large scale, of individual particles.

FIG. 4 is a view similar to FIG. 1 but showing an alternate form of the invention; and FIG. 5 is a sectional view of a special type of particle, greatly enlarged.

More particularly describing the invention, in general I utilize the effect of a magnetic field upon particles of magnetic material suspended between a source of radiant energy and a radiant energy-sensing means for the purpose of detecting changes in the direction or intensity of the field. The individual particles should be so shaped that they act as a greater barrier to the passage of rays when in a given position than when otherwise disposed. Thus the amount of radiant energy, such as light for example, which can pass the particles and reach the energy-sensing means depends upon the relative orientation of the particles. When disposed at random the interference offered by the particles to the passage of light rays is different from that offered by the particles when oriented in one or more given directions. Thus changes in the direction of a magnetic field relative to the instrument, and/or changes in the strength of the field are indicated by the sensing means.

Referring now to FIG. 1, I show one means for carrying out the invention. The means includes a radiant energy source 12, a radiant energy-sensing means 14, and a plurality of magnetically sensitive particles 15 therebetween. In the form of the invention shown in FIG. 1, I provide an unusually stable, constant or unvarying light source since this is essential to correct functioning of the device. The light source includes a radioactive substance 18, and a phosphorescent material or phosphor 20 which is adapted to be energized by the substance 18. The radioactive material should be a substance having a long half-life, and, by the way of example Thallium 204, which has a half-life of four years, is suitable for the purpose. The decay curve of intensity of radiation for Thallium 204 is negligible in this use. Suitable shielding such as the lead member 21 is shown provided around the radioactive substance 18.

The phosphor 20 may be any well known phosphorescent material which can be energized by the radioactive substance 18 to cause it to phosphoresce. Zinc sulphide is an example.

In front of the phosphor material 20 I provide a container 25 which may be of glass or other suitable substance having either translucent or transparent end walls 26 and 27. The side wall 28, which may be cylindrical, may be opaque or, if not opaque, a separate opaque outer wall 29 should be provided to prevent entrance of light into the container.

In the container I provide a multiplicity of magnetic, magnetizable or magnetically sensitive opaque particles 15 which are preferably suspended or dispersed throughout a suitable light transmitting liquid or fluid medium 30. The viscosity of the medium should necessarily be regulated to the size of the particles in order to maintain the particles in suspension. A hydrocarbon liquid is suitable and since the magnetically sensitive particles would be of the ferric group, and hence would be readily oxidized in an aqueous solution, the suspension agent should be an aqueous-free organic liquid. Suitable thickeners can be used as required.

By way of example, the particles may be of the order of .0015 inch at their greatest dimension or the particle size may range down to .001 micron. With the larger particles the viscosity range of the solution would probably be in the range of 750 to 1000 centipoises. With the smaller particles the viscosity might be as low as 10 to 20 centipoises, and kerosene would appear to be desirable.

The density of the particles are dispersed in the medium should be such that passage of light rays through the container is not completely blocked. Also, as previously indicated, the individual particles, or at least a substantial proportion thereof should be so shaped as to present a greater area or barrier to passage of light when disposed in one direction than in another. Thus by way of example, in FIG. 2 I show a particle 15A (many times enlarged) of irregular shape but which is relatively thin. Also, in FIG. 3 I show another particle, designated 15B, of elongated regular cylindrical shape. It will be apparent from these examples that innumerable shapes can be used to equal advantage.

In order to detect and give an indication of the amount of light passing through the body of liquid medium 30 containing the particles of magnetic material, I provide the light-sensing means 14 which is preferably a standard photomultiplier tube 32 which will readily sense variations in the light reaching the tube and greatly amplify the signal current induced thereby in a manner well known in the art. The tube 32 is shown provided with a suitable power supply 33. The amplified signal or current from the tube is fed to an amplifier 35 and the output of the amplifier is fed to operate a recorder 36. In place of the photomultiplier tube I may use any type of light sensitive cell and several stages of amplification.

In the operation of the means shown in FIG. 1, the radioactive substance 18 causes the phosphor to glow at a constant intensity thereby giving off light which is free to reach the light-sensing means 14 except as it is hindered by the imperfect light-transmitting quantities of the fluid medium 30 and by the opaque magnetic particles 15 suspended in the medium. It will be apparent, therefore, that variable amounts of light will reach the light-sensing means depending upon the orientation of the particles 15 in the medium 30. The particles themselves, being magnetic or magnetically sensitive, respond to the influence of magnetic force by turning and aligning themselves in accordance with the intensity and strength of the magnetic field in which they are placed. Thus changes in the magnetic field produces changes in the amount of light reaching the light-sensing means and the later is thereby effective to give a signal or indication which is directly related to the changes in the magnetic field.

In FIG. 4 I show a somewhat simpler form of the invention wherein a radioactive substance 18A is used to directly affect a radiant energy-sensing or sensitive means 40 of any type known in the art, such as a SCINTILLOMETER for example.

In order to provide particles which would be particularly effective for the purpose I prefer to use particles which include a metal or other substance of a type which offers substantial interference to the passage of such rays as are given off by radioactive substances. Thus in FIG. 5 I show a cross sectional view of a particle 15C being formed in part of a magnetic metal 50 and in part of lead 51. The example illustrated in FIG. 5 is not intended to be taken as limiting the type of particle which might be used.

In the form of the invention illustrated in FIG. 4, the particles 15C (or others which might be used in their place), depending upon their orientation, will act to control the amount of radiant energy reaching the sensing means 40 and thereby cause the latter to indirectly measure or indicate changes in the magnetic field. The particles are suspended in a fluid medium 30A within a container 28A. In either form of the invention the variout parts may be housed together in a case, or otherwise mounted.

Although I have illustrated and described preferred forms of my invention, I contemplate that various charges and modifications can be made therein without departing from the invention, the scope of which is indicated by the following claims.

I claim:
1. An oriented particle magnetometer, comprising a radioactive energy source, an energy-sensing means, a plurality of magnetically sensitive bodies interposed between said source and said means, said bodies being so shaped as to prevent a greater barrier to the passage of rays from said source to said means when disposed in a given position than when otherwise disposed, and means for suspending said bodies in dispersed condition and for rotational movement between said source and means, said bodies being formed in part of a material which offers substantial interference to the passage of rays emanating from radioactive sources.

2. An oriented particle magnetometer as set forth in claim 1 in which a phosphor is positioned adjacent the radioactive energy source and between it and the magnetically sensitive bodies.

3. An oriented particle magnetometer as set forth in claim 1 in which the magnetically sensitive bodies are of the ferric group and are suspended in an aqueous-free organic liquid.

References Cited by the Examiner
UNITED STATES PATENTS

| | | | |
|---|---|---|---|
| 1,835,612 | 12/1931 | Pearson | 88—61 X |
| 1,963,496 | 6/1934 | Land | 324—34 X |
| 2,140,269 | 12/1938 | Pelkus et al. | 250—77 |
| 2,764,733 | 9/1956 | De Forest | 324—38 |
| 2,844,789 | 7/1958 | Allen | 324—43 |
| 2,910,593 | 10/1959 | Laing et al. | 250—77 |
| 3,030,509 | 4/1962 | Carlson | 250—71.5 |

WALTER L. CARLSON, *Primary Examiner.*

LLOYD McCOLLUM, FREDERICK. M. STRADER, *Examiners.*